Sept. 27, 1955     J. D. ROHRER ET AL     2,718,936
MULTI-STRIP BRAKE LINING
Filed Nov. 30, 1954
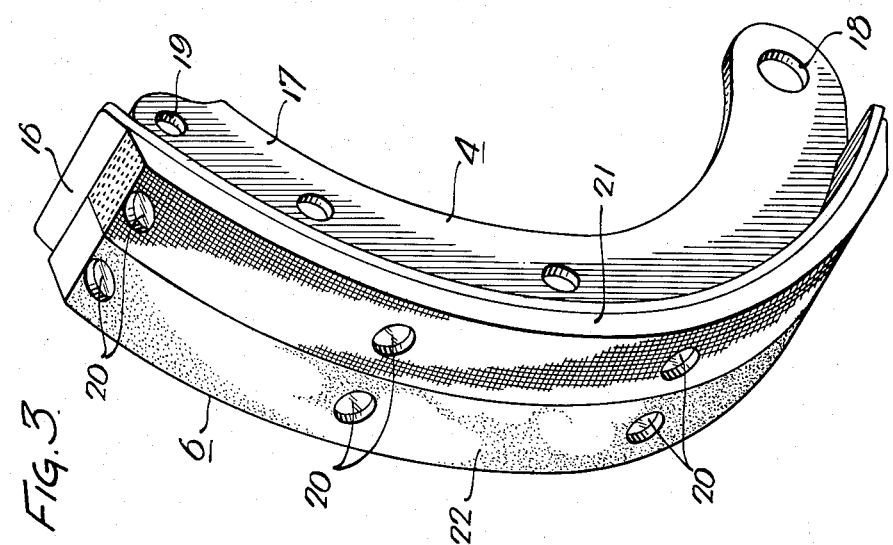
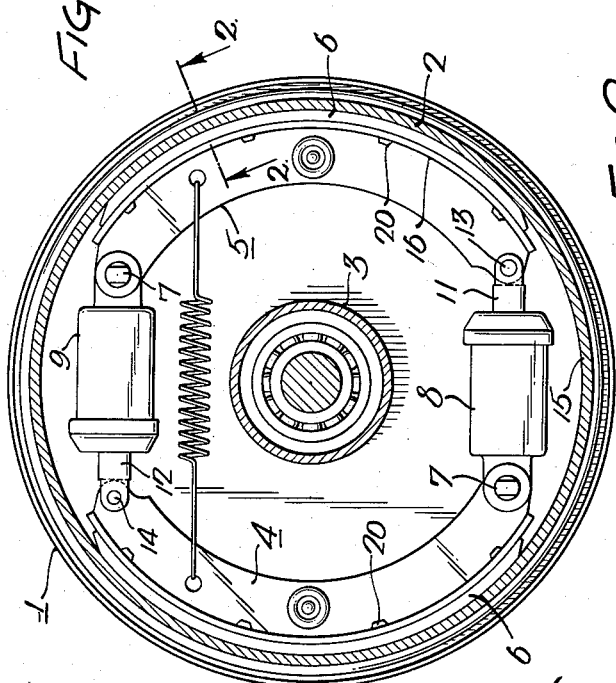
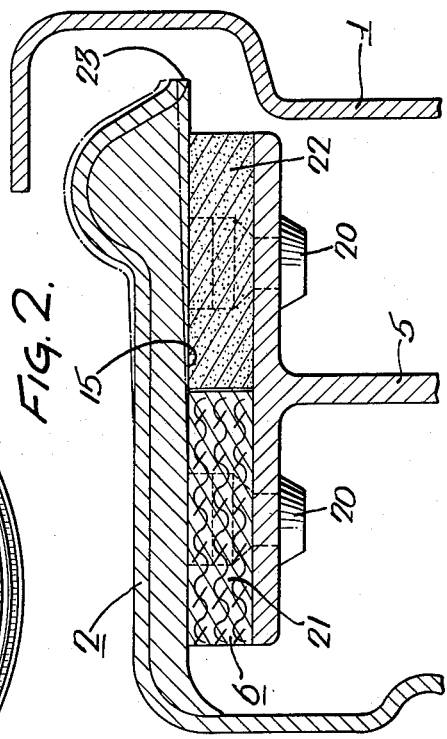
Inventors:
John D. Rohrer
Carl W. Sachs
by Howson & Howson
Attys United States Patent Office 2,718,936
Patented Sept. 27, 1955

2,718,936

MULTI-STRIP BRAKE LINING

John D. Rohrer, Manheim, and Carl W. Sachs, Lancaster, Pa., assignors to Raybestos-Manhattan, Inc., Manheim, Pa., a corporation of New Jersey Application November 30, 1954, Serial No. 472,028

1 Claim. (Cl. 188—78)

This invention relates to an improvement in brake linings of the type used in the brakes of automotive and industrial equipment.

It has been recognized that generally improved results are obtainable by use in brake linings of this class of friction materials of different composition or structure selected so that one material may complement the other in respect at least to some of the functional characteristics of the liner. It has been found for example that whereas one lining material may be funtionally superior, in some respects, to another differing material, it may also be inferior in some other respect, and that by use in a single liner of materials of the different characteristics, it is possible to minimize the effects of the undesirable characteristics and to take advantage of the desirable properties of both materials.

It has been proposed to form a composite brake lining wherein differing materials arranged in blocks or bands extending transversely of the lining and transversely therefor to the direction of the relative movement between the brake lining and the coactive surface of the brake drum. In this case, however, the frictional contact between the differing materials of the composite lining and the drum is not uniform, and also the effectiveness of the individual material is imparted by its relatively short dimension in the direction of the aforesaid relative movement. It has been proposed also to provide brake shoes with linings composed of separate longitudinal strips of two remotely different compositions of which one is composed of metal such as copper or lead. These metals, while sometimes used to advantage as supplementary components of brake linings in conjunction with other more efficient friction materials are not well adapted to function alone in that capacity, and their proposed use mentioned above was for the sole purpose of offsetting in some degree the tendency of certain otherwise desirable friction materials to exhibit decreased frictional effect when wet with water.

In no instance known to us has it been proposed to produce a composite brake lining consisting of two longitudinal sections of differing friction materials each having a high degree of functional efficiency for brake lining purposes and capable of effective use independently in a brake lining of the character to which the invention relates. By a practice of the invention it has been possible to produce a composite brake lining whose functional characteristics are not only superior to linings composed of the component materials if used individually, but which is also superior to the prior linings of composite type.

One object of the invention, therefore, is to provide a brake lining of composite type comprising complementary friction materials selected as to individual characteristics and relatively arranged in the lining so as to utilize to maximum advantage the differing and complementary characteristics.

Another object of the invention is to provide a lining of the stated character which in the conventional passenger motor vehicle brake structure, comprising a plurality, usually two, brake shoes arranged in tandem with respect to the co-acting cylindrical surface of the brake drum, may be relatively arranged on the said shoes so as to compensate for any tendency of the differing friction materials to wear the surface of the drum unevenly.

Another specific object of the invention is to provide an improved brake lining capable of compensating in substantial degree for the tendency of the brake drum to "bell-mouth" under heat, as hereinafter described.

Still more particularly, the invention contemplates the provision of a novel composite brake lining comprising two longitudinal strips of equal widths one consisting of a brake lining material of woven type and the other of a brake lining material of moulded type.

The invention may be more readily understood by reference to the attached drawings wherein:

Fig. 1 is a sectional elevational view of a brake of conventional passenger motor vehicle type comprising a pair of brake shoes with linings made in accordance with the invention;

Fig. 2 is an enlarged sectional view on the line 2—2, Fig. 1 and

Fig. 3 is a view in perspective showing a brake lining made in accordance with the invention attached to a brake shoe of conventional form.

With reference to the drawings, the brake illustrated more or less diagrammatically in Fig. 1 is of a type conventionally used in passenger motor vehicles. It comprises essentially the usual relatively fixed brake-support 1, the brake drum 2 attached to the rotary hub 3 of the wheel, and two shoes 4 and 5 which are mounted on the support 1 inside the drum and which carry the brake linings 6 forming the subject of the present invention. In the present instance the shoes 4 and 5 are pivotally supported at one end and respectively on anchor bolts 7, 7 on the support 1, and these bolts also form pivotal supports for hydraulic cylinders 8 and 9 which contain pressure responsive plungers, 11 and 12 respectively, said plungers being attached at their outer ends and at 13 and 14 respectively to the free ends of the brake shoes 5 and 4. Hydraulic pressure in the cylinders 8 and 9 activate the brakes in well known manner by pressing the linings 6 against inner confronting surface 15 of the drum 2. One of the brake shoes with its lining is illustrated in Fig. 3. The shoe comprises the usual segmental body plate 16 to the convex face of which is attached the brake lining 6. A longitudinal web or flange 17 projects from the concave face of the plate 16 and has at one extended end an aperture 18 for the anchor bolt 7 and at the other end an aperture 19 for connection to the plunger 12. The lining, indicated generally by the reference numeral 6, is attached to the plate 16 by any suitable means such for example as rivets 20 (see Fig. 2). In accordance with the invention, the lining comprises two longitudinal sections 21 and 22, preferably of equal width and jointly embracing the entire transverse dimension and the effective length of the body plate. The sections 21 and 22 of the lining are composed of friction materials capable of functioning effectively in conjunction with the brake drum 1 to control the rotation of the wheel to which the drum is attached by frictional engagement with the inner cylindrical face of the drum, and to this end the brake shoes may be activated by the hydraulic cylinders as described above. While other means for mounting may be employed, the brake shoes 4 and 5 are mounted in the present instance for movement about the fixed pivots 7, 7, and with this type of mounting particularly, difficulty has been experienced in obtaining optimum and noise-free performance.

In accordance with the present invention, the sections 21 and 22 differ from each other in one or more essential respects affecting their primary function in the brake. Thus the section 21 may consist of a lining material of woven type consisting of woven textile fabric impregnated with or constituting a matrix for a plastic friction composition, while the section 22 may be of moulded or extruded type. Each of these types of friction material has certain unique and important advantages, and each also lacks certain of the desirable physical characteristics of the other. The materials are affected differently by heat, for example, and will not fade or lose friction at the same time, so that a single shoe having a lining composed of both of these materials in the aforedescribed arrangement will be relatively free from this fault, and good braking with minimum pedal pressure will be available at all times. Also, the materials have different frequency rates, and this difference will tend to dampen out noise resulting from vibration. Differences in density and compressibility of the two materials will tend to prevent or to relieve high pressure spots which are also incipient noise-makers; and since the linings will not be affected in the same way by moisture, at least one of the sections will always be available with proper friction under wet conditions.

With a composite lining of the general character described, it is possible also to compensate in some degree for "bell-mouthing" of the drum, i. e., the radial expansion of the free edge portion 23 of the drum which sometimes occurs as a result of heat. By placing the section of the composite lining having the higher compressibility at the side of the shoe which adjoins the closed side of the drum, some degree of contact can be maintained across the full drum face in spite of the expansion of the free edge indicated in dotted lines in Fig. 2.

It will be apparent that in a composite lining of this character where the component parts of the lining may exhibit different scoring propensities with respect to the surface of the drum against which they act, there will be a tendency toward irregular wear in the adjoining circumferential areas of the drum swept by the respective lining components. This undesirable effect may be compensated by reversing the positions of the linings on the two brake shoes with respect to the line of demarcation between the two sections which preferably will be the longitudinal centerline of the lining. Thus the circumferential area swept by the woven component 21 of the lining of one shoe will be swept also by the moulded component of the lining of the other shoe, and this will be true also of the other components of the respective linings. Thus the scoring and wearing effect of the shoes upon the drum will be balanced and substantially uniform.

It will be understood that the invention is not restricted to lining materials of woven and moulded types, and that the two components may be, for example, both of the same type but differing from each other either in form or composition, and in respects calculated to afford more efficient or durable braking action in accordance with the principle of our invention.

We claim:

A brake comprising a rotary drum and two relatively stationary shoes spaced circumferentially of the drum and each having a lining for frictional engagement with a common confronting circumferential face of the drum, each said lining comprising two longitudinal sections extending circumferentially of the drum and in the direction of the relative movement between the drum and the shoes and differing characteristically in respects affecting said frictional engagement, and said linings occupying reverse positions on the shoes with respect to said sections so that the areas of the drum face swept by the respective sections of one of the linings will be swept by the differing sections of the other lining.

References Cited in the file of this patent

UNITED STATES PATENTS

| 1,919,542 | Dick | July 25, 1933 |
| 2,028,621 | Norton | Jan. 21, 1936 |
| 2,033,968 | Fether | Mar. 17, 1936 |
| 2,661,819 | Strohm | Dec. 8, 1953 |